United States Patent

Matoba

[11] Patent Number: 5,224,245
[45] Date of Patent: Jul. 6, 1993

[54] CORD RETAINER

[75] Inventor: Hiroshi Matoba, Toyama, Japan

[73] Assignee: Yoshida Kogyo K. K., Tokyo, Japan

[21] Appl. No.: 877,227

[22] Filed: May 1, 1992

[30] Foreign Application Priority Data

May 1, 1991 [JP] Japan ................ 3-40142[U]

[51] Int. Cl.⁵ .............................................. F16G 11/00
[52] U.S. Cl. .................. 24/115 G; 24/136 R; 403/305
[58] Field of Search ............ 24/115 G, 115 R, 136 R, 24/132 WL, 129 A, 712.5, 712.9, 712.1; 403/305, 301, 300

[56] References Cited

U.S. PATENT DOCUMENTS

| | | | |
|---|---|---|---|
| 3,080,867 | 3/1963 | Eichinger | 24/115 G |
| 4,336,636 | 6/1982 | Inshiguro et al. | 24/115 M |
| 4,393,550 | 7/1983 | Yang et al. | 24/115 G |
| 4,506,417 | 3/1985 | Hara | 24/115 G |
| 4,622,723 | 11/1986 | Krauss | 24/136 R |
| 4,675,948 | 6/1987 | Bengtsson | 24/115 G |

FOREIGN PATENT DOCUMENTS

| | | | |
|---|---|---|---|
| 57-203809 | 12/1982 | Japan . | |
| 63-52412 | 4/1988 | Japan . | |
| 63-117308 | 7/1988 | Japan . | |
| 2-28609 | 2/1990 | Japan . | |
| 2066891 | 7/1981 | United Kingdom | 24/115 G |

Primary Examiner—Victor N. Sakran
Attorney, Agent, or Firm—Hill, Van Santen, Steadman & Simpson

[57] ABSTRACT

A retainer assembly for retaining cords, strings or the like in position comprises a cylindrical tube having holes, a resilient locking means mounted in the tube and a pair of end taps and having a through bore. The locking means has arcuately inwardly bent upper and lower wing members defining therebetween slits. The end taps each have an arrow-headed portion adapted to be received through and locked inside of the slit of the locking means and a tapered portion resiliently engageable in the slit and movable between the upper and lower wing members to bring the bore into and out of registry with the holes.

4 Claims, 3 Drawing Sheets

CORD RETAINER

BACKGROUND OF THE INVENTION

1. Field of the Invention

This invention relates to a retainer assembly for retaining cords or strings in position that fasten jackets, sports wear, hoods, shoes and the like.

2. Prior Art

Retainers or stoppers for such cords or strings have been proposed in different form and construction. A typical prior example comprises a tubular body having registering holes adjacent to opposite ends, a pair of end taps having corresponding holes and adapted to fixedly close the respective ends of the body and a compression spring interposed therebetween, the arrangement being that the taps are brought toward each other axially of the tubular body against the tension of the compression spring until the holes in the tubular body register with the holes in the end taps. This type of retainer is disclosed for example in Japanese Laid-Open Utility Model Publications Nos. 57-203809, 63-52412 and 63-117308. The retainer is split into halves, one of which is assembled with the compression spring and one end tap and thereafter joined with the other half portion. Alternatively, engaging means provided in the inner surface of the tubular body and in the outer surface of the respective taps are joined together by rotating the taps relative to the tubular body. This assembling procedure is literally tedious and time-consuming.

Another prior art device is shown in Japanese Open Utility Model Publication No. 2-28609 in which there is provided a cord retainer having a tubular body with a centrally located hole, an outer sleeve fixedly connected to one end of the tubular body and an inner sleeve movable within the outer sleeve, the two sleeves having respective holes registrable with the central hole in the tubular body against the tension of a compression coil spring interposed between the sleeves. Assembly of this cord retainer is likewise complex, involving increased numbers of component parts and hence higher cost.

SUMMARY OF THE INVENTION

With the foregoing drawbacks of the prior art in view, the present invention seeks to provide a cord retainer which is relatively simple in construction with the number of component parts reduced to an absolute minimum and highly reliable in operation.

According to a preferred embodiment of the invention, a cord retainer comprises a cylindrical tube forming a retainer body, a pair of end taps adapted to close opposite ends of the tube, and a resilient locking means disposed centrally in the tube and resiliently engageable with the end taps to allow the latter to make an axial movement relative to the tube, all of the component parts of the retainer being preferably made from a plastics material for ease of manufacture and for the purposes which are hereinafter described.

According to the invention, there is provided a cord retainer which comprises: a cylindrical tube having diammetrically aligned holes in a pair at each of its opposite ends; a resilient locking means fixedly mounted in the cylindrical tube and having upper and lower wing members interconnected centrally in spaced-apart relation to provide a pair of identical chambers, the wing members each having inwardly directed end flanges and being bent arcuately inwardly with the end flanges held in closely confronting relation to define therebetween slits; and a pair of end taps each having through bores registrable with the holes of the cylindrical tube and further having an arrow-headed portion for anchoring engagement with the locking means.

The above and other advantages and features of the invention will be better understood from the following detailed description taken in conjunction with the accompanying drawings.

DETAILED DESCRIPTION OF THE INVENTION

Figure 1:
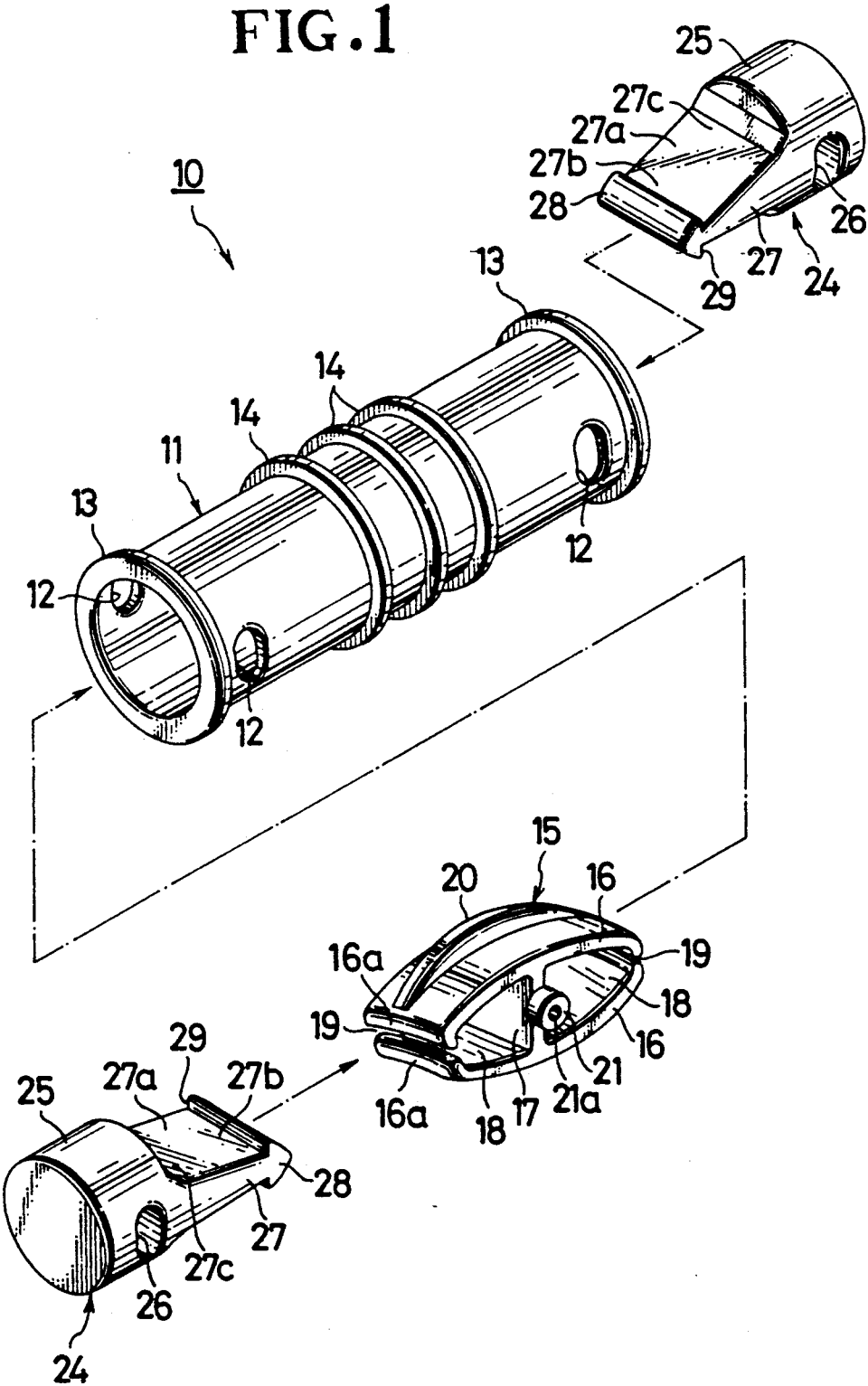
FIG. 1 is an exploded perspective view of a cord retainer in accordance with the present invention.

Referring now to the drawings and FIG. 1 in particular, there is shown a retainer 10 for retaining cords, strings or the like against unintentional displacement relative to an article to which they are attached. The retainer 10, herein comprehensively referred to as a cord retainer, comprises a cylindrical tube 11 forming a retainer body which is provided with oblong or otherwise round holes 12, 12 in a pair registering with each other diammetrically across the tube 11 adjacent to one end thereof and a similar pair of aligned holes 12, 12 adjacent to the opposite end of the tube 11 for receiving a cord C (FIG. 5) or the like. The cylindrical tube 11 has annular flanges 13, 13 at the respective ends and a plurality (three in the illustrated embodiment) of annular rims 14 spaced around its central periphery for purposes later described.

Figure 3:
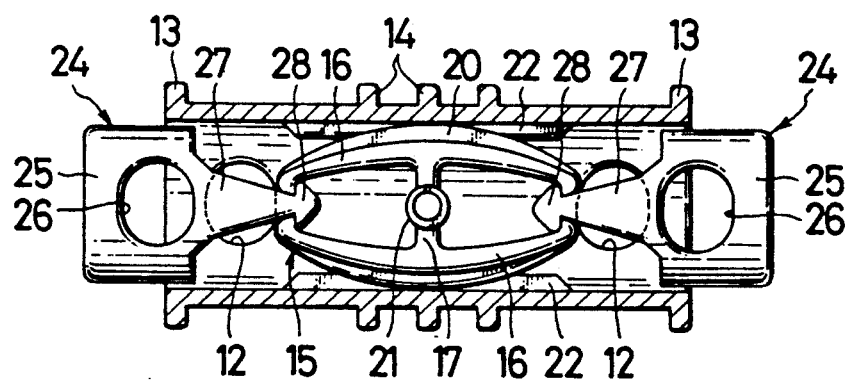
FIG. 3 is an axial cross-sectional view of the cord retainer assembled.

Designated generally at 15 is a resilient locking means which comprises a pair of upper and lower wing members 16, 16 interconnected centrally in spaced-apart relation by a connecting post 17 which provides on opposite sides thereof two identical chambers 18, 18 and which extends substantially diammetrically across the tube 11 when the retainer 10 is assembled as shown in FIG. 3. The upper and lower wing members 16, 16 are bent arcuately inwardly about the connecting post 17 with their respective inwardly directed end flanges 16a, 16a held in closely confronting relation to define therebetween a small gap or slit 19 communicating with corresponding chamber 18 at each of their opposite ends. An arcuate rib 20 is formed on the outer surface of each of the upper and lower wing members 16, 16 and extends centrally longitudinally thereof as better shown in FIG. 1. The connecting post 17 has a pair of lugs 21, 21 projecting laterally from opposite ends thereof and each having a recess 21a.

Figure 2:
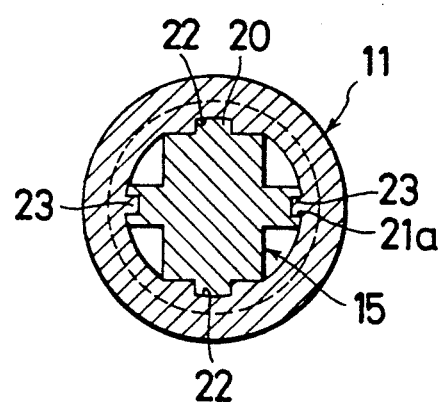
FIG. 2 is a radial cross-sectional view of a portion of the of FIG. 1.

The resilient locking means 15 thus constructed is assembled into the cylindrical tube 11, in which instance the arcuate ribs 20, 20 are inserted in diammetrically opposed engaging grooves 22, 22 formed axially in the inner wall of the tube 11, and the recesses 21a, 21a of the lugs 21, 21 are held in receptive engagement with diammetrically opposed pins 23, 23 projecting inwardly from the inner wall of the tube 11 at an angular distance of substantially 90° apart from the engaging grooves 22, 22 as better shown in FIG. 2. The use of lugs 21, 21 with recesses 21a, 21a for engagement with the pins 23, 23 can be disposed with, if arrangements are made such that the arcuate ribs 20, 20 are clamped under pressure into firm gripping engagement with the engaging grooves 22, 22.

Designated generally at 24, 24 are a pair of end taps for closing respective open ends of the cylindrical tube 11. Each end tap 24 has a barrel portion 25 substantially round in cross section and slightly smaller in diameter than the inside diameter of the cylindrical tube 11 so that the end tap 24 can move within and through the tube 11 in a manner later described. The tap 24 has a through bore 26 extending diammetrically across the barrel portion 25 and registrable with the holes 12, 12 of the cylindrical tube 11. The tap 24 includes a tapered connecting portion 27 with opposite surfaces 27a, 27a thereof progressively converging from the barrel portion 25 toward a cross-sectionally arrow-headed anchoring portion 28 disposed remotely from the barrel portion 25. The anchoring portion 28 has vertical abutments 29 bordering with a reduced terminal end 27b of the tapered connecting portion 27 opposite to a thicker end 27c thereof merging with the barrel portion 25.

When assembling the cord retainer 10, the resilient locking means 15 is inserted into and fixed in place within the cylindrical tube 11 in the manner above described, followed by mounting the pair of end taps 24, 24 from opposite ends of the tube 11, in which instance the barrel portion 25 of each tap is pushed axially inward through the tubular body 11 of the retainer 10 until the arrow-headed anchoring portion 28 passes through the slit 19 of the locking means 15 into the chamber 18, urging the slit 19 to spread open against the tension between the upper and lower wing members 16, 16. Releasing the barrel portion 25 causes the tap 24 to retract under the influence of tension exerted by the wing members 16, 16 with the arrow-headed portion 28 snapped in place (with its vertical abutments 29 borne against the inner walls of the end flanges 16a, 16a of the wing members 16, 16), as shown in FIG. 3.

Figure 4:
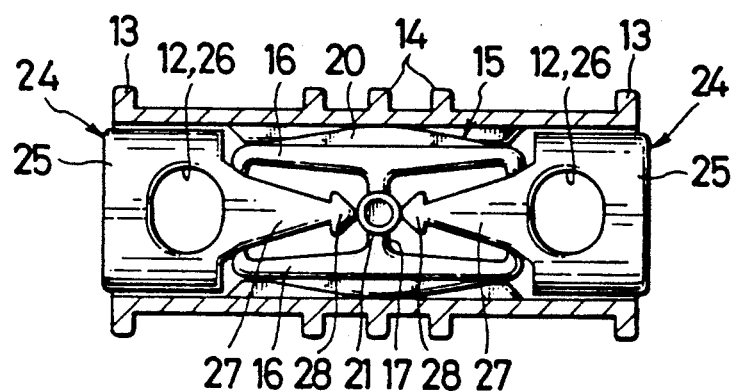
FIG. 4 is a view similar to FIG. 3 but showing the cord in one operative position.
Figure 5:
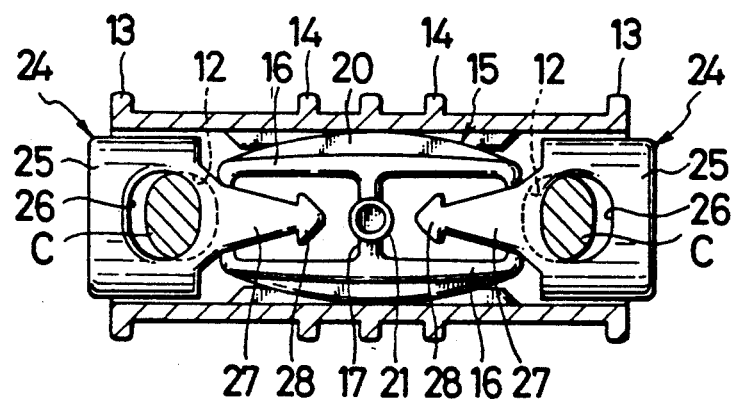
FIG. 5 is a view similar to FIG. 4 but showing the cord retainer in another operative position.

Now when applying the cord C to the cord retainer 10, the two end taps 24, 24 are pushed further inwardly toward each other from the position of FIG. 3 to the position of FIG. 4 until the apex of each arrow-headed anchoring portion 28 is brought into abutting engagement with the lug 21 of the locking means 15, in which position the through bore 26 in the barrel portion 25 of each end tap 24 registers with the corresponding aligned holes 12, 12 of the cylindrical tube 11 as shown in FIG. 4. After the cord C is passed through the thus registered holes 12, 12 and bores 26 and adjusted in length as desired, the end taps 24, 24 are released so that the taps 24, 24 are urged to retract or move outwardly away from each other by the tension or closing force of the locking means 15, whereupon the through bores 26, 26 in the respective end taps 24, 24 become displaced with respect to their associated holes 12, 12 in the cylindrical tube 11, leaving the cord C immovably trapped in the retainer 10 as shown in FIG. 5.

Manipulation of the end taps 24, 24 is facilitated by the provisions of the annular flanges 13 and the annular rims 14 which can be gripped with the fingers of the user while moving the end taps 24, 24 axially inwardly of the cylindrical tube 11 against the tension of the locking means 15.

Obviously, various modifications and variations of the present invention are possible in the light of the above teaching. It is therefore to be understood that within the scope of the appended claims the invention may be practiced otherwise than as specifically described.

What is claimed is:

1. A cord retainer which comprises:
   (i) a cylindrical tube having diammetrically aligned holes in a pair at each of its opposite ends;
   (ii) a resilient locking means fixedly mounted in said cylindrical tube and having upper and lower wing members interconnected centrally in spaced-apart relation to provide a pair of identical chambers, said wing members each having inwardly directed end flanges and being bent arcuately inwardly with said end flanges held in closely confronting relation to define therebetween slits; and
   (iii) a pair of end taps each having through bores registrable with said holes of said cylindrical tube and further having an arrow-headed portion for anchoring engagement with said locking means.

2. A cord retainer according to claim 1 wherein said cylindrical tube has a plurality of annular rims spaced around its periphery.

3. A cord retainer according to claim 1 wherein all of its component parts are made of a plastics material.

4. A cord retainer according to claim 1 wherein said end taps each have a tapered connecting portion with opposite surfaces thereof progressively converging toward said arrow-headed portion.

* * * * *